(12) United States Patent
Liu et al.

(10) Patent No.: US 7,841,739 B2
(45) Date of Patent: Nov. 30, 2010

(54) TOTAL INTERNAL REFLECTION SIDE EMITTING COUPLING DEVICE

(75) Inventors: Ying Liu, Kowloon (HK); Chen-Jung Tsai, New Territories (HK)

(73) Assignee: Hong Kong Applied Science and Technology Research Institute Co. Ltd., New Territories, Hong Kong (CN)

( * ) Notice: Subject to any disclaimer, the term of this patent is extended or adjusted under 35 U.S.C. 154(b) by 168 days.

(21) Appl. No.: 11/959,546

(22) Filed: Dec. 19, 2007

(65) Prior Publication Data
US 2008/0158881 A1    Jul. 3, 2008

(30) Foreign Application Priority Data
Dec. 19, 2006    (CN) .................. 2006 1 0161742

(51) Int. Cl.
*F21V 5/00*    (2006.01)
*F21V 7/00*    (2006.01)
(52) U.S. Cl. ................. 362/245; 362/308; 362/327
(58) Field of Classification Search ........... 362/244, 362/245, 308, 327, 616, 617, 618, 619; 349/65, 349/125
See application file for complete search history.

(56) References Cited

U.S. PATENT DOCUMENTS

| | | | |
|---|---|---|---|
| 6,679,621 B2 | 1/2004 | West et al. ................. 362/327 |
| 6,773,126 B1 * | 8/2004 | Hatjasalo et al. ............ 362/601 |
| 7,305,653 B2 * | 12/2007 | Davis et al. ................ 717/100 |
| 7,322,721 B2 * | 1/2008 | Noh et al. ................... 362/327 |
| 7,332,721 B2 * | 2/2008 | Worstell ................ 250/363.03 |
| 7,341,358 B2 * | 3/2008 | Hsieh et al. ................ 362/97.1 |
| 7,397,982 B2 * | 7/2008 | Sailer et al. .................. 385/27 |
| 2006/0018122 A1 | 1/2006 | Negley ....................... 362/326 |

* cited by examiner

*Primary Examiner*—John A Ward
(74) *Attorney, Agent, or Firm*—Merchant & Gould P.C.

(57) ABSTRACT

The present invention discloses a coupling lens system, which comprises a collimation lens for collimating light from light source to a first direction; a first lens surface for total internal reflecting light from light source to the first direction; and a second lens surface for total internal reflecting light from the first direction to a second direction. Wherein an angle between the first direction and the second direction can be larger than, smaller than or equal to 90 degrees, and preferably between 70 to 100 degrees. Additionally, the system further comprises at least one extra surface parallel to the second lens surface, wherein at least one extra surface has a length L and is parallel to each other. At the same time, each surface and another surface has a distance D in between, and the length L can be equaled to or larger than the distance D according to purposes and further modifies a shape of the coupling lens system.

22 Claims, 5 Drawing Sheets

TOTAL INTERNAL REFLECTION SIDE EMITTING COUPLING DEVICE

FIELD OF INVENTION

The present invention relates to a semiconductor light emitting device, more specifically relates to a package for semiconductor light emitting device and method used for backlighting system.

BACKGROUND

The subject invention relates to a semiconductor light emitting device, more specifically relates to the packaging of semiconductor light emitting device and other applications. Semiconductor light emitting devices, such as Light Emitting Diodes (LED) or laser diodes, are widely used to many applications. As known to the persons skilled in the art, a semiconductor light emitting device comprises one or more semiconductor layer disposed to emit coherent and/or incoherent light after conducting to electricity. It is also known that a semiconductor light emitting device is packaged to provide external electrical connectivity, heat dissipation, lens or wave guide, environmental protection and/or other functions.

For example, it may be desirable to change light from a semiconductor light emitting device from one direction to another. In some applications, it may be desirable to guide the light from the light emitting surface that is perpendicular (referred to as "vertical" light here) to the semiconductor light emitting device to a direction of the light emitting surface that is parallel (referred to as "horizontal" direction here) to the semiconductor light emitting device. It may also be desirable to re-direct the light within a range of 360° above the horizontal direction. This kind of direction changing can be used to backlight applications, such as backlights of Liquid Crystal Displays (LCDs) or "light emitting walls" applications.

West et al disclosed U.S. Pat. No. 6,679,621, entitled "Side Emitting LED And Lens", wherein the abstract states: "The present invention discloses, comprising a bottom surface, a reflecting surface, a first refracting surface obliquely angled with respect to a central axis of the lens, and a second refracting surface extending as a smooth curve from the bottom surface to the first refracting surface. Light entering the lens through the bottom surface and directly incident on the reflecting surface is reflected from the reflecting surface to the first refracting surface and refracted by the first refracting surface to exit the lens in a direction substantially perpendicular to the central axis of the lens. Light entering the lens through the bottom surface and directly incident on the second refracting surface is refracted by the second refracting surface to exit the lens in a direction substantially perpendicular to the central axis of the lens. The lens may be advantageously employed with LEDs, for example, to provide side-emitting light-emitting devices. A lens cap attachable to a lens is also provided."

Additionally, Negley et al also disclosed U.S. Patent Publication No. 2006/0018122, entitled "Reflective Optical Elements For Semiconductor Light Emitting Devices", wherein the abstract states: "The present invention discloses a optical element for semiconductor light emitting devices, comprising a body that is configured to attach to a semiconductor light emitting device. The body includes an integral lens. A mirror is provided in and/or on the body. The body, the lens and the mirror are positioned such that, in operation, light that is emitted from the semiconductor light emitting device enters the body, is reflected from the mirror and passes through the lens to emerge from the body."

The prior art described above cannot provide a high efficiency side emitting. In fact, when applying semiconductor light emitting devices on several backlight applications, the aim is to have semiconductor light emitting devices provide uniform light source and/or reduce the number of light emitting devices required and/or dynamically control multiblock region. Therefore, the present invention is able to achieve the above goals.

SUMMARY OF INVENTION

The present invention provides a highly efficient side-emitting coupling lens system, comprising a direct lens for directing light from light source to a first direction; a first lens surface for total internal reflecting light from light source to the first direction; and a second lens surface for total internal reflecting light from the first direction to a second direction; wherein an angle between the first direction and the second direction can be larger than, smaller than or equal to 90 degrees, which the angle is preferably between 70 to 110 degrees. Additionally, the system further comprises at least one extra surface parallel to the second lens surface; wherein the at least one extra surface has a length L and is parallel to each other with a distance D in between, and the length L is equal to or larger than the distance D.

The present invention provides another embodiment of a light-emitting device using the side emitting lens system, comprising at least one light source; and a coupling lens for covering the light source and guiding light from the light source, wherein the coupling lens comprises a direct lens for directing light from light source to a first direction; a first lens surface for total internal reflecting light from light source to the first direction; and a second lens surface for total internal reflecting light from the first direction to a second direction; wherein an angle between the first direction and the second direction can be larger than, smaller than or equal to 90 degrees, which the angle is preferably between 70 to 110 degrees. Additionally, the device further comprises at least one extra surface parallel to the second lens surface; wherein the at least one extra surface has a length L and is parallel to each other with a distance D in between, and the length L is equal to or larger than the distance D. And the at least one light-emitting diode chip emits light with at least one color, and the device further comprises a control system for controlling the light with at least one color to appear sequentially, appear at once, or disappear at once.

The present invention provides another embodiment of a backlight system using the light emitting device, comprising a plurality of light emitting devices for providing light; and a light guide with a plurality of side surfaces, a bottom surface and a transparent upper surface, wherein the bottom surface comprises a plurality of patterns for diffusing light from the plurality of light emitting devices, coupling light from the plurality of light emitting devices into the light guide and emitting through a upper surface; wherein the plurality of light emitting devices comprises at least one light source chip; and a coupling lens for covering the light source and guiding light from the light source, wherein the coupling lens comprises a direct lens for directing light from light source to a first direction; a first lens surface for total internal reflecting light from light source to the first direction; and a second lens surface for total internal reflecting light from the first direction to a second direction. Wherein light from the total internal reflection of the second lens surface is coupled to the light guide, diffused from a certain pattern of the bottom surface of the lighting guide, and emit through the upper surface to outside of the lighting guide.

More specifically, wherein the bottom surface of the light guide comprises a plurality of bumps and V-shaped trenches for reflecting light.

BRIEF DESCRIPTION OF THE DRAWINGS

FIG. 3 is FIG. 1 in a particular embodiment, illustrating lengths of a plurality of total internal reflection surfaces and distances in between.

DETAILED DESCRIPTION OF THE INVENTION

Figure 1:
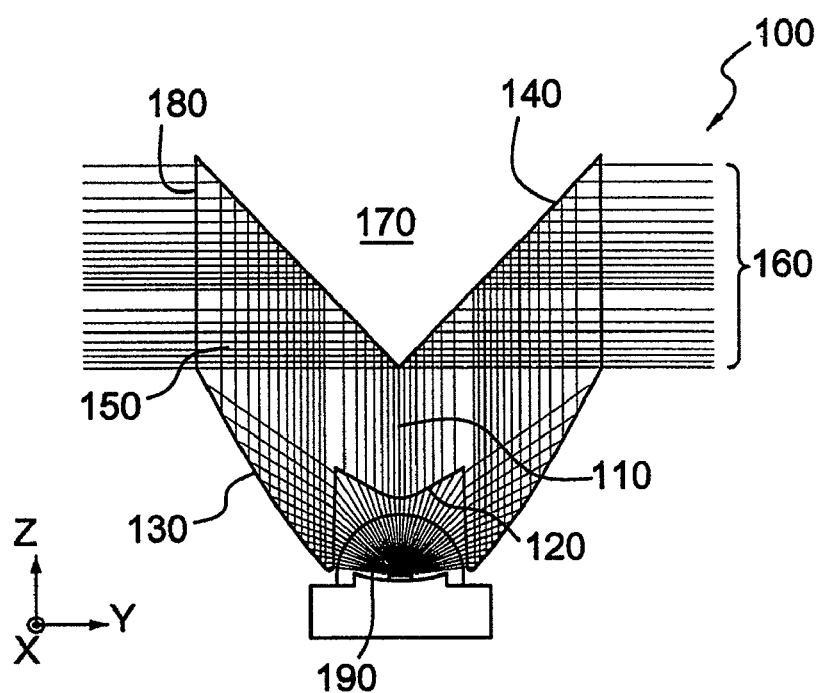
FIG. 1 is a cross-sectional view according to an embodiment of the present invention of an optical element of a semiconductor light emitting device.

The description below is in reference to the accompanied drawings to explain the present invention in full aspect. However, the present invention should not be limited to the embodiments recited in the specification. More specifically, it provides the embodiments to fully disclose the contents and completely deliver the scope of the present invention to persons who skilled in the art. In the drawings, the surfaces and thickness of areas are not proportionally exaggerated for clear purposes. In all the drawings, the same number indicates the same element. The term "and/or" used in the specification comprises one of the subjects associated or any of the subjects and all combinations.

The technical terms used in the specification are for explaining particular embodiments, not for limiting the present invention. The singular term "a", "one" and "the" used in the specification also comprise plural forms, unless the background condition is specified. It should be further understood that the term "comprise" used in the specification defines existing characteristics, integers, steps, operations, components and/or elements, but not limiting the existence or addition of one or more other characteristics, integers, steps, operations, components, elements and/or their combination.

It should be known that, for example, when an element of a surface or an area is "on" or extended "to" be "above" another element, it can be directly on or directly extended to be above another element. In contrast, when an element is "directly on" of "directly extended to" be "above" another element, there exits no medium element. It should also be known that when an element is "connected" or "coupled" to another element, the element can be directly connected or coupled to another element, or medium elements can exist. In contrast, when an element is "directly connected" or "directly coupled" to another element, there exists no medium element.

It should be understood that although the terms the first, the second etc. can be used in the specification to explain various components, elements, areas, surfaces and/or sections, the terms are not limited to explain the components, elements, areas, surfaces and/or sections. The terms are only used to distinguish one component, element, area, surface and/or section from another component, element, area, surface and/or section. Therefore, a first component, element, area, surface and/or section described below can be called as a second component, element, area, surface and/or section without being out of the concept of the present invention.

In addition, comparative terms, such as "lower", "bottom" or "horizontal" and "higher", "top" or "vertical", are used in the specification to explain the relationships between one element and another in the drawings. It should be known that other than the orientation described in the drawings, the comparative terms comprises devices in different orientations. For example, if the device in the drawing is placed upside-down, it explains the elements located on "lower" sides of other elements being orientated to be on the "higher" sides of other elements. Therefore, explanatory terms "lower" can comprise "lower" or "higher" locations depending on a particular orientation of the drawing. Similarly, if the device in the drawing is placed upside-down, it explains the elements located "below" or "under" the other elements being orientated to be "above" other elements. Therefore, explanatory terms "below" or "under" can comprise "upper" or "lower" locations.

The specification refers to idealistic embodiments of the present invention as explanatory examples of actual embodiments of the present invention. Therefore, it can be predicted that shapes in the drawings are varied with manufacturing techniques and/or tolerances. The embodiments of the present invention should not be limited to the particular shapes as described in the specification, and should comprise shape manufacturing tolerances. For example, when describing or explaining an area of a cone normally comprises a circular vertex and rough and/or non-linear characteristics. Therefore, the descriptions of the area are representative, not to limit the scope of the present invention with precise descriptions of a shape of an area. In addition, terms like "horizontal" and "vertical" indicates precisely 0 degree or 90 degree and also other directions or relations.

Unless defined elsewhere, the terms (comprising technical and scientific terms) used in the specification have meanings as understood by the persons who skilled in the art. It should be further known that definition of the terms defined in general dictionaries are to be seen as common meanings in relevant technical background, not to be seen as ideal meaning or formal meaning, unless stated.

FIG. 1 is a cross-sectional view according to an embodiment of the present invention of an optical element of a semiconductor light emitting device. Please refer to FIG. 1, it shows an optical element 100 according to an embodiment of the present invention comprising a body 110 of a coupling lens, disposed to cover a radiating light source 190, which can be formed by a semiconductor light emitting device or a known light emitting device. The light of light source 190 goes through a collimation lens 120 to have a part of the light guided paralleled towards a Z direction, and a part of the light without going through the collimation lens 120 goes through a first lens surface 130 and is guided paralleled towards the Z direction after reflection. All lights toward the Z direction go through a second lens surface 140, and are guided to a direction of X-Y plane after reflection to output. In an embodiment, all lights toward the Z direction go through the second lens surface 140, and are guided to a direction of X-Y plane after reflection forming an angle with the Z axis, that is between 70 and 100 degrees.

Also referring to FIG. 1, the body 110 of the coupling lens comprises a lens 150 integrated therein. In FIG. 1, the lens 150 is formed with at least a part of the outer surface of the body of the coupling lens, which the body of the coupling lens is concaved with respect to light paths. However, in other embodiments, the lens can be formed one or more elements. The elements are produced within or above the body of the coupling lens for convenience integration. In addition, convex, concave and/or sectional lens 150 can be provided for different applications. For example, in FIG. 1, an empty space 170 is provided within the body 110 of the coupling lens, and located on the second lens surface 140. In other embodiment that the second lens surface 140 is at least partially embedded in the body 110 of the coupling lens and/or extended on the outer surface of the body 110 of the coupling lens. It should also be known that lens in the specification take reflection, not refraction nor diffraction, as main optical mechanism. However, the lens in the specification does not need to form an image. Additionally, it should be known that although the term "reflection" is used, "total internal reflection" substantially takes refraction as main optical mechanism. As shown in FIG. 1 ray tracking 160. Persons who skilled in the art should know that the term "light" indicates any radiation, scatter, visible and/or invisible (e.g. ultra-violet) light.

The second lens surface 140 is further explained here. In some embodiments, the second lens surface 140 can be a flat surface or a non-flat obliquely extended lens, which is oriented to emit light with a single beam from the optical element. In other embodiments, the second lens surface 140 can be a V-shaped lens to redirect light, like shown in FIG. 1. In some embodiments, an axis of the lens 150 extends along the horizontal direction.

Figure 2:
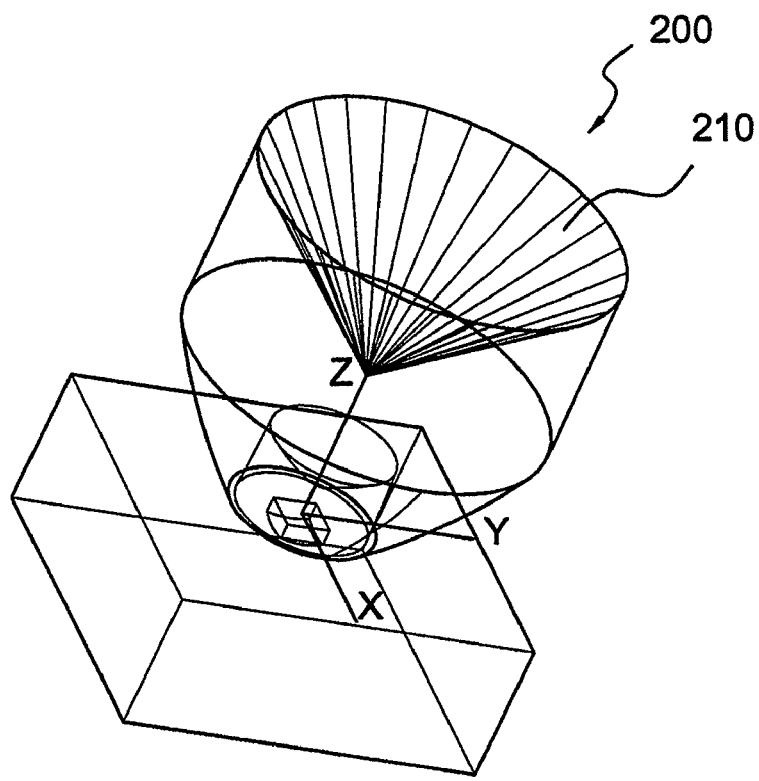
FIG. 2 is a perspective view according to an embodiment of the present invention of an optical element of a semiconductor light emitting device.

As explained above, light can be emitted in a form of single beam along an X-Y plane direction, such as a single beam emitted to a left or right side of FIG. 1, or a pair of beam emitted to a left or right side of FIG. 1. However, in other embodiments of the present invention, even though it shows as a V-shaped lens in a cross-sectional view, it actually is a cone-shaped lens 210, as shown in FIG. 2, for emitting light from the body 110 of the coupling lens within a 360° range on the X-Y plane. Additionally, other embodiments can use a part of cone-shaped section and/or other elements to emitting light at 90°, 180°, or other angles on the X-Y plane.

The above description with FIG. 1 explains that the second lens surface 140 can comprise a reflection surface extending in and/or above the body 110 of the coupling lens. In some embodiments, an insert can be used to stuff at least part of a reminding space in the empty space 170. The insert comprises passive material and/or other material, which can reduce reflection deterioration of the second reflection surface induced by, for example, environmental reasons.

Figure 3:
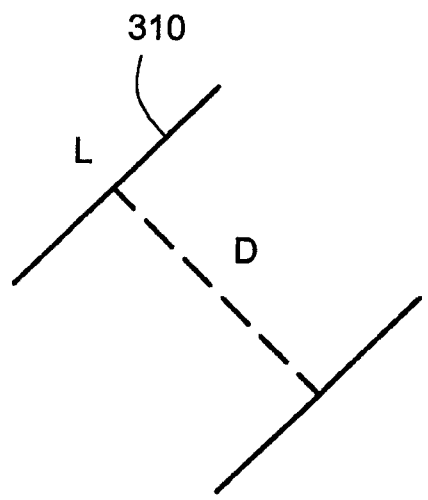

FIG. 3 shows that the second lens surface can be divided into total internal reflection surfaces each having various lengths L, and each of total internal reflection surfaces is parallel to one another with distances D in between. In a particular embodiment, the lengths L of each of total internal reflection surfaces can be equaled or not equaled to one another, and the distances D of each of total internal reflection surfaces can be equaled or not equaled to one another.

Figure 4:
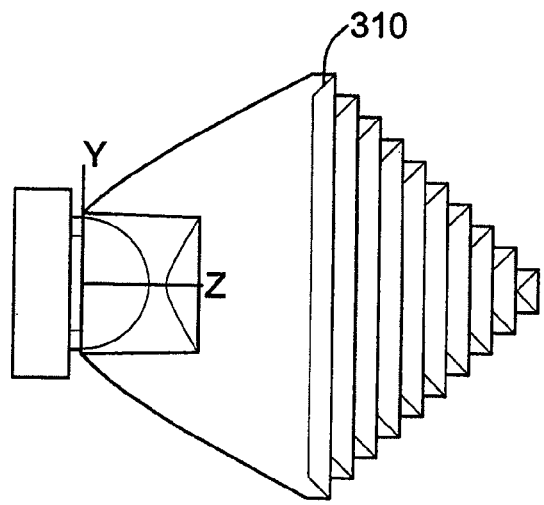
FIG. 4 is a side view of an outer shape according to a particular embodiment of the present invention.
Figure 5:
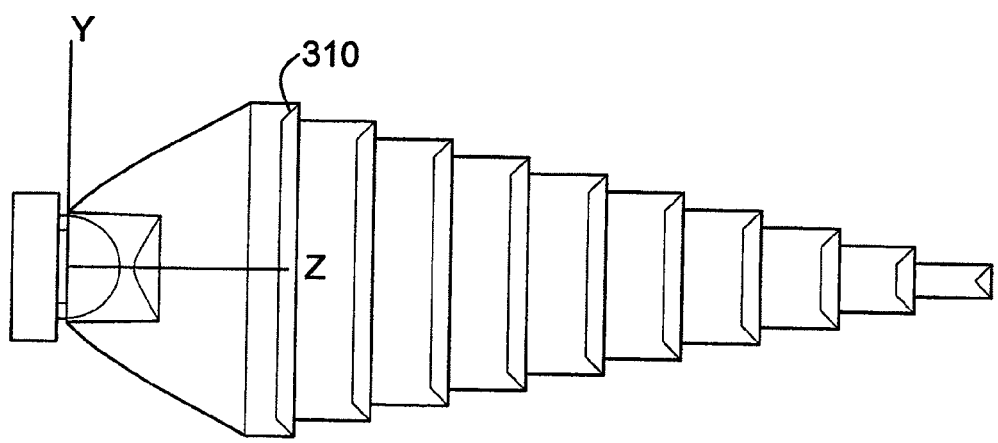
FIG. 5 is a side view of an outer shape according to a particular embodiment of the present invention.

In a particular embodiment of the present invention, as shown in FIG. 4 that the lengths L and distance D of all total internal reflection surfaces 310 are equaled to one another. In another particular embodiment, as shown in FIG. 5, the lengths L and distance D of all total internal reflection surfaces 310 are equaled to one another, and the distance D is larger than the length L.

In a particular embodiment of the present invention, the light source 190 of the system described above can comprise at least one light emitting diode chip or ordinary light emitter. At least one light emitting diode chip emits light with at least one color and the device further comprises a control system for controlling the light with at least one color to appear sequentially, appear at once, or disappear at once.

Figure 6:
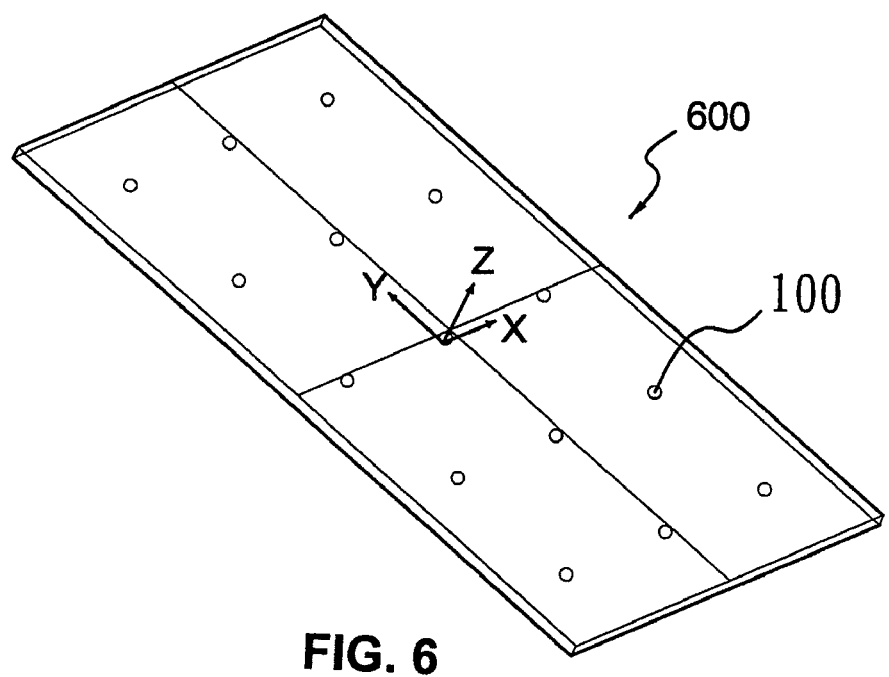
FIG. 6 is an oblique view of a backlight system according to a particular embodiment of the present invention.

In a particular embodiment of the present invention, as shown in FIG. 6, a plurality of the optical element 100 are further applied in a backlight system 600, which characterized in the special optical structure of the present invention can significantly increase distances between optical elements and hence reduces the number of the optical elements without affecting an uniformity of a backlight system.

Figure 7:
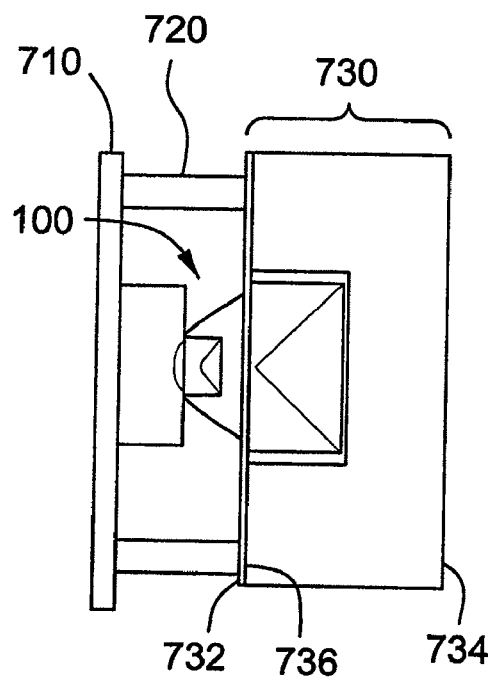
FIG. 7 is a cross-sectional view of an optical element in a backlight system according to a particular embodiment of the present invention.
Figure 8:
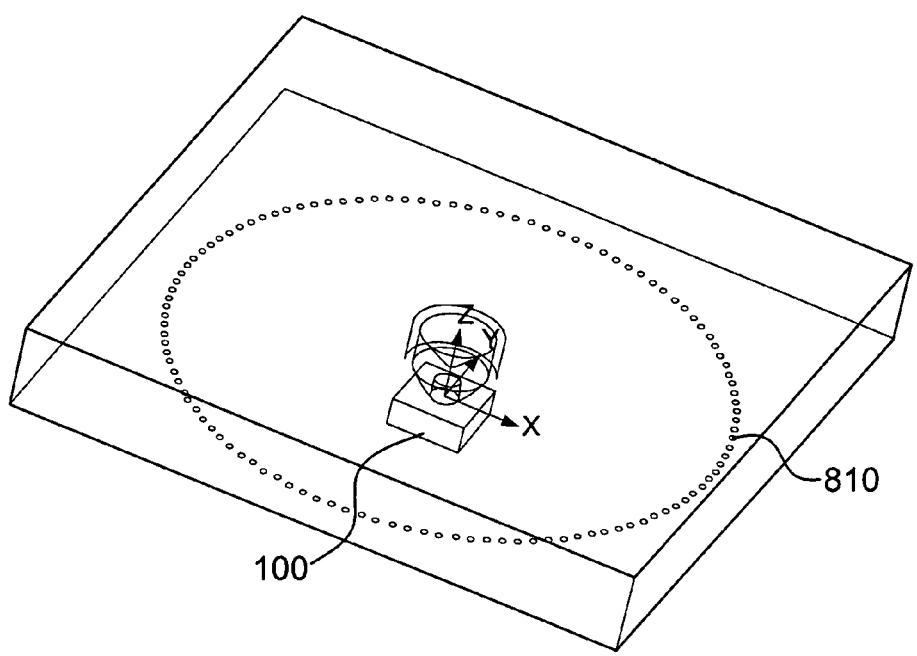
FIG. 8 is a partial oblique view of a backlight system according to a particular embodiment of the present invention.
Figure 9:
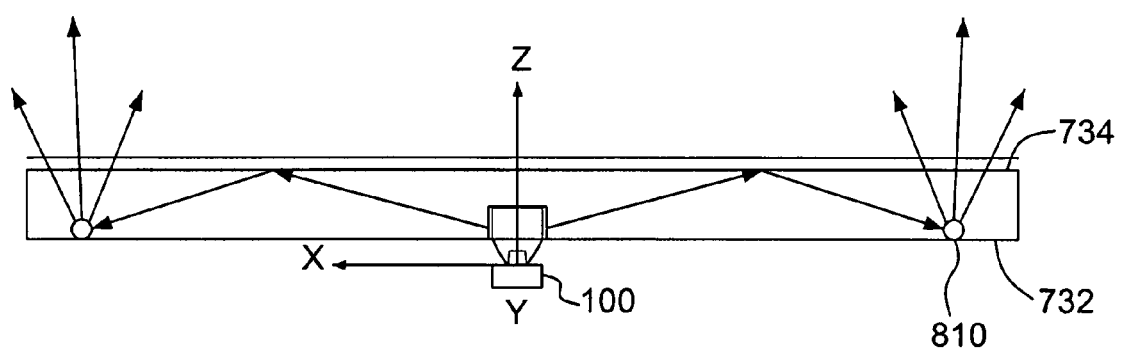
FIG. 9 is a cross-sectional view of a backlight system according to a particular embodiment of the present invention.

FIG. 7 shows applications of each of the optical elements in FIG. 6, the system comprises a base 710 and a light guide 730 with a supporter 720 in between connecting the two. The light guide comprises a plurality of sides and an emitting side 734, and a bottom surface 732 reflecting a plurality of patterns of the light. An emitting surface 180 of the optical element 100 is placed in the light guide 730. Wherein, as shown in FIG. 8 and FIG. 9, the light through the second lens surface towards the X-Y plane direction and partially penetrate an upper surface 734 of the light guide to an outside of the light guide; other part of the light reflect through various surfaces of the light guide and is diffusing reflected by the bottom surface 732 of the light guide through the upper surface 734 to the outside of the light guide. In an embodiment of the present invention, the bottom surface of the light guide reflects light with a plurality of bumps 810. In another embodiment, the plurality of optical elements 100 are placed in the light guide for clarity, the bumps 810 are illustrated as one circle instead of a plurality of circles centering the optical element 100 with same or different radius. The bumps 810 can also be arranged in any array other than circle or in random.

Figure 10:
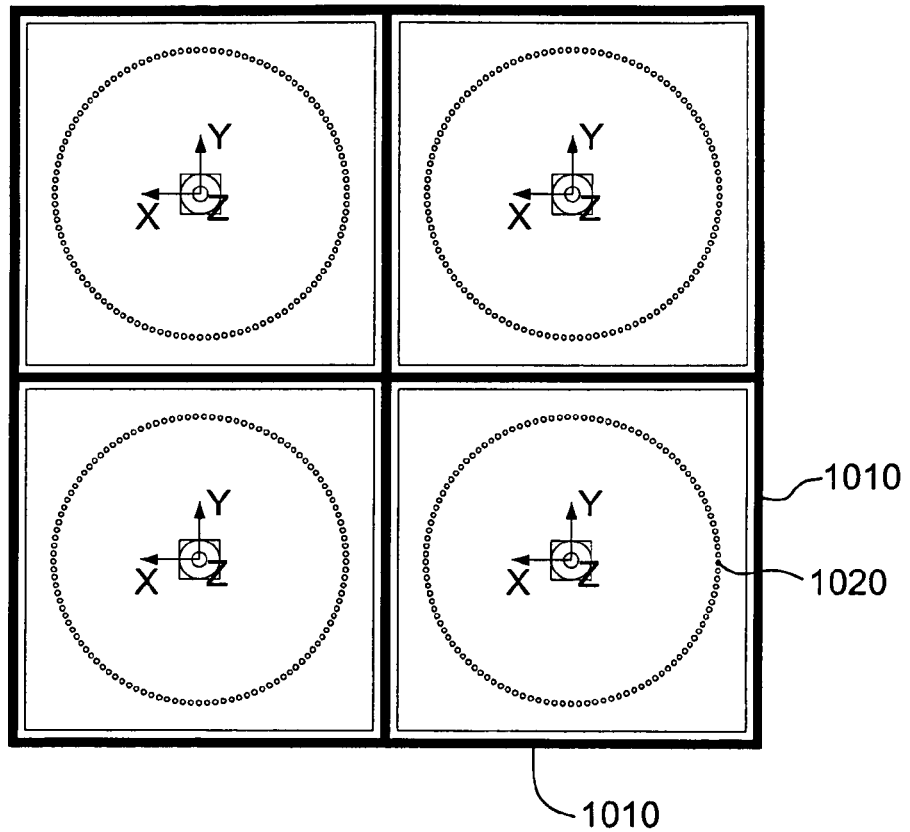
FIG. 10 is a vertical view of a backlight system according to a particular embodiment of the present invention.
Figure 11:
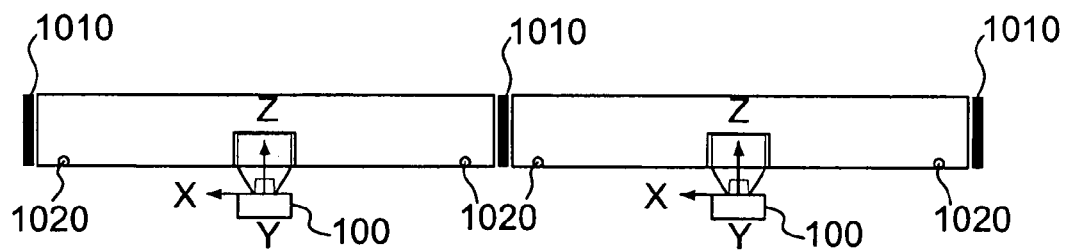
FIG. 11 is a cross-sectional view of a multiblock backlight system according to a particular embodiment of the present invention.

According to another embodiment of the present invention, as shown in FIGS. 10 and 11, a plurality of reflection sheets 1010 is used to surround each of the light guide of backlight system 600, wherein each of the light guide comprises at least one light emitting devices and the light for providing uniform intensity to form a multiblock backlight system 1000. In particular, the plurality of light guides surrounded by the plurality of reflection sheets can be rectangles or polygons with number of sides not equal to 4, or a combination of the two Similarly, the bumps 1020 are illustrated as one circle in each light guide for clarity.

The invention claimed is:

1. A side-emitting coupling lens, comprising:
    a collimation lens surface for collimating a first portion of light from a light source to a first direction;
    a first lens surface for total internal reflection of a second portion of the light from the light source to the first direction; and
    a second lens surface for total internal reflection from the first direction to a second direction of both the light collimated by the collimating lens surface and the light totally internally reflected by the first lens surface,
    wherein an angle between the first direction and the second direction is between 70 to 110 degree.

2. The system as in claim 1, wherein an angle between the first direction and the second direction can be larger than, smaller than or equal to 90 degree.

3. The system as in claim 1, the system further comprising at least one extra surface parallel to the second lens surface.

4. The system as in claim 3, wherein each of the at least one extra surface has a length L and is parallel to each other with a distance D in between.

5. The system as in claim 4, wherein the length L is equal to the distance D.

6. The system as in claim 4, wherein the length L is larger than the distance D.

7. A light-emitting device, comprising:
 at least one light source; and
 a coupling lens for covering the light source and guiding light from the light source,
 wherein the coupling lens comprises a collimation lens surface for collimating a first portion of the light from light source to a first direction; a first lens surface for total internal reflection of a second portion of the light from light source to the first direction; and a second lens surface for total internal reflection of light from the first direction to a second direction of both the light collimated by the collimating lens surface and the light totally internally reflected by the first lens surface.

8. The device as in claim 7, wherein an angle between the first direction and the second direction can be larger than, smaller than or equal to 90 degrees.

9. The device as in claim 7, wherein an angle between the first direction and the second direction is between 70 to 110 degrees.

10. The device as in claim 7, the device further comprising at least one extra surface parallel to the second lens surface.

11. The device as in claim 10, wherein each of the at least one extra surface has a length L and is parallel to each other with a distance D in between.

12. The device as in claim 11, wherein the length L is equal to the distance D.

13. The device as in claim 11, wherein the length L is larger than the distance D.

14. The device as in claim 7, wherein the at least one light source emits light with at least one color, and the device further comprises a control system for controlling the light with at least one color to appear sequentially or at once, or disappear sequentially or at once.

15. A light-emitting backlight system, comprising:
 a plurality of light-emitting devices for providing light; and
 a light guide with a plurality of side surfaces, a bottom surface and a transparent upper surface,
 wherein the bottom surface comprises a plurality of patterns for diffusing light from the plurality of light-emitting devices, coupling light from the plurality of light-emitting devices to the light guide and emitting through a upper surface;
 wherein the plurality of light emitting devices comprises:
 at least one light source; and
 a coupling lens for covering the light source and guiding light from the light source,
 wherein the coupling lens comprises a collimation lens for collimating light from light source to a first direction; a first lens surface for total internal reflecting light from light source to the first direction; and a second lens surface for total internal reflecting light from the first direction to a second direction.

16. The system as in claim 15, wherein light from the reflecting of the second lens surface is coupled into the light guide, diffused from a certain pattern of the bottom surface of the light guide, and emit through the upper surface to outside of the lighting guide.

17. The system as in claim 15, wherein the bottom surface of the light guide comprises a plurality of bumps and V-shaped trenches for reflecting light.

18. The system as in claim 15, wherein the plurality of light emitting devices are placed in the light guide.

19. A multiblock backlight system, comprising:
 a plurality of light emitting devices for providing light;
 a plurality of light guides with a plurality of side surfaces, a bottom surface and a transparent upper surface, wherein the bottom surface comprises a plurality of patterns for diffusing light from the plurality of light-emitting diode devices, coupling light from the plurality of light emitting devices to the light guide and emitting out through a upper surface; and
 a plurality of reflector sheets, for surrounding each of the plurality of light guides,
 wherein each of the plurality of lighting guides comprises at least one light emitting device with each providing uniform brightness light;
 wherein at least one light emitting device comprises:
 at least one light source; and
 at least one coupling lens for covering the light-emitting diode chip and guiding light from the light source,
 wherein the coupling lens comprises a collimation lens for collimating light from light source to a first direction; a first lens surface for total internal reflecting light from light source to the first direction; and a second lens surface for total internal reflecting light from the first direction to a second direction.

20. The system as in claim 19, wherein light from the total internal reflection of the second lens surface is coupled into the light guide, diffused from a certain pattern of the bottom surface of the lighting guide, and emit through the upper surface to outside of the lighting guide.

21. The system as in claim 19, wherein the bottom surface of the light guide comprises a plurality of bumps and V-shaped trenches for reflecting light.

22. The system as in claim 19, wherein the plurality of light-emitting diode devices are placed in the light guide.

* * * * *